US010297216B2

(12) United States Patent
Wang et al.

(10) Patent No.: US 10,297,216 B2
(45) Date of Patent: May 21, 2019

(54) GATE DRIVING CIRCUIT AND ARRAY SUBSTRATE USING THE SAME

(71) Applicant: SHENZHEN CHINA STAR OPTOELECTRONICS TECHNOLOGY CO., LTD., Shenzhen, Guangdong (CN)

(72) Inventors: Xiaoxiao Wang, Guangdong (CN); Peng Du, Guangdong (CA)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 291 days.

(21) Appl. No.: 14/907,930

(22) PCT Filed: Jan. 12, 2016

(86) PCT No.: PCT/CN2016/070625
§ 371 (c)(1),
(2) Date: Jan. 27, 2016

(87) PCT Pub. No.: WO2017/107258
PCT Pub. Date: Jun. 29, 2017

(65) Prior Publication Data
US 2018/0033385 A1  Feb. 1, 2018

(30) Foreign Application Priority Data

Dec. 24, 2015  (CN) .......................... 2015 1 0992431

(51) Int. Cl.
*G09G 3/20* (2006.01)
*G09G 3/36* (2006.01)
(Continued)

(52) U.S. Cl.
CPC ......... *G09G 3/3648* (2013.01); *G02F 1/1303* (2013.01); *G09G 3/2074* (2013.01);
(Continued)

(58) Field of Classification Search
CPC ......... G09G 2310/0286; G09G 3/3677; G09G 2310/0267; G09G 3/3648;
(Continued)

(56) References Cited

U.S. PATENT DOCUMENTS

2003/0231735 A1* 12/2003 Moon .................. G09G 3/3685
377/64
2013/0141470 A1* 6/2013 Wang ................... G09G 3/3648
345/690

(Continued)

*Primary Examiner* — Hong Zhou
(74) *Attorney, Agent, or Firm* — Ladas & Parry LLP

(57) ABSTRACT

A gate driving circuit and an array substrate using the same are described. The gate driving circuit pulls up and pulls down the voltage level of the node in one display frame by a first voltage signal of a second driving module and a second voltage signal of a third driving module to control the high level and low level respectively of scan signal in the scan output terminal for sequentially writing data signal to all the first row sub-pixels, all the second row sub-pixels and all the third row sub-pixels of the one display frame in order to prevent the sub-pixels from RC delay and color deviation, thereby improving the display quality of the LCD.

9 Claims, 5 Drawing Sheets

(51) Int. Cl.
*G02F 1/13* (2006.01)
*G02F 1/1345* (2006.01)
*G02F 1/1362* (2006.01)

(52) U.S. Cl.
CPC ......... *G09G 3/3677* (2013.01); *G09G 3/3696* (2013.01); *G02F 1/1362* (2013.01); *G02F 1/13454* (2013.01); *G09G 2230/00* (2013.01); *G09G 2300/0408* (2013.01); *G09G 2310/0235* (2013.01)

(58) Field of Classification Search
CPC ......... G09G 2300/0408; G09G 3/3674; G09G 3/3266; G09G 2320/0242; G09G 3/3607; G09G 2320/0223; G09G 3/3225; G09G 2320/02; G09G 2230/00; G09G 2310/0235; G09G 3/2074; G09G 3/3696; G02F 1/1303; G02F 1/13454; G02F 1/1362
See application file for complete search history.

(56) References Cited

U.S. PATENT DOCUMENTS

2015/0155052 A1* 6/2015 Ma .................. G09G 3/36 345/100
2015/0310819 A1* 10/2015 Xiao .................. G11C 19/28 345/212

\* cited by examiner

GATE DRIVING CIRCUIT AND ARRAY SUBSTRATE USING THE SAME

BACKGROUND OF THE INVENTION

Field of Invention

The present invention relates to a technical field of a liquid crystal display (LCD), and more particularly to a gate driving circuit and an array substrate using the same which are applicable to the LCD.

Description of Prior Art

Since the LCD is provided with the features of low radiation, small size and low power consumption for consumers, therefore, the conventional display unit with cathode ray tube (CRT) is increasingly replaced by the LCD. An LCD panel is widely used in communication products including a notebook computer, a personal digital assistant (PDA), a flat panel television and mobile phone.

Conventionally, the display array substrate in the tri-gate driving mode has the following problems, which are ongoing: the amount of chip-on-film is reduced necessarily; and the wiring length in the fanout region corresponding to the source driver is increased and the fanout resistance/capacitance (RC) delay becomes critical so that the waveform distortions of the data signal due to the maximum RC delay in two lateral sides of display panel which results in an insufficient charging status and color deviation, e.g. mura effect, in the two lateral sides. For an example of column pixel type, if a pure yellow color frame with level L255 is displayed, it is required to totally charge the pixel with red color and the pixel with green color ("R" and "G") at a level L255. If the pixel with red color is charged before the pixel with green color is charged, the data signal waveform for driving the pixel with red color is distorted and thus the pixel with red color is insufficiently charged so that the pixel with red color at the level L255 cannot meet the brightness requirement and therefore the pure yellow color frame in the two sides tends to lightly green color. On the contrary, if the pixel with green color is charged before the pixel with red color is charged, the data signal waveform for driving the pixel with green color is distorted and thus the pixel with red color is insufficiently charged so that the pixel with green color at the level L255 cannot meet the brightness requirement and therefore the pure yellow color frame in the two sides tends to lightly red color.

The waveform signal of source driver is a data signal in two lateral display regions of the display panel with the tri-gate driving mode. The data signal waveform for the pixel which is charged early will be distorted since the RC delay of the data signal is increased. For an example of a column pixel-driving type, if a pure yellow color frame with level L255 is displayed, it is required to charge the pixel with red color and the pixel with green color at a level L255. If the data signal of red color is written before the data signal with green color is written, the data signal waveform for the red color is distorted and thus the data signal of red color is insufficiently written so that the pure yellow color frame in the two sides tends to lightly green color. On the contrary, if the data signal of green color is written before the data signal with red color is written, the data signal waveform for the green color is distorted and thus the data signal of green color is insufficiently written so that the pure yellow color frame in the two sides tends to lightly green color. Consequently, there is a need to develop a novel gate driving circuit to solve the problems of the conventional technique.

SUMMARY OF THE INVENTION

Therefore, one objective of the present invention is to provide a gate driving circuit and an array substrate using the same by pulling up and pulling down the voltage level of the node in one display frame to control the high level and low level respectively of scan signal in the scan output terminal for sequentially writing data signal to all the first row sub-pixels, all the second row sub-pixels and all the third row sub-pixels of the one display frame in order to prevent the sub-pixels from RC delay and color deviation, thereby improving the display quality of the LCD.

Based on the above objective, the present invention sets forth a gate driving circuit according to one embodiment of the present invention. The gate driving circuit is disposed on an array substrate of a liquid crystal display (LCD), wherein the array substrate comprises a display frame having a plurality of first row sub-pixels, a plurality of second row sub-pixels and a plurality of third row sub-pixels, and each of the first row sub-pixels, the second row sub-pixels and the third row sub-pixels is electrically connected to one scan line corresponding to the gate driving circuit. The gate driving circuit comprises a first driving module, for receiving a clock signal wherein the first driving module comprises a node and a scan output terminal correspondingly connected to a scan line; a second driving module electrically connected to the first driving module, for receiving a previous stage control signal and a first voltage signal wherein when the previous stage control signal enables the second driving module, the second driving module outputs the first voltage signal to the first driving module in order to pull up a level of the node to a high level, and when the node is in the high level, the scan output terminal correspondingly outputs a first scan signal with the high level to the scan line based on a period of the clock signal in order to drive the first row sub-pixels; a third driving module electrically connected to the first driving module and the second driving module, for receiving a next stage control signal and a second voltage signal wherein when the next stage control signal enables the third driving module, the third driving module outputs the second voltage signal to the second driving module in order to pull down the level of node and the scan output terminal to the low level, and when the node is in the low level, the scan output terminal correspondingly outputs the first scan signal with the low level to the scan line based on the period of the clock signal until the first row sub-pixels are driven by different gate driving circuits respectively.

In one embodiment, the display frame is sequentially arranged by different types of the first row sub-pixels, the second row sub-pixels and the third row sub-pixels, and the first row sub-pixels, the second row sub-pixels and the third row sub-pixels form the display frame.

In one embodiment, the first row sub-pixels, the second row sub-pixels and the third row sub-pixels are composed of the red row sub-pixels, the green row sub-pixels and the blue row sub-pixels.

In one embodiment, a level of the first voltage signal is greater than a level of the second voltage signal, and the first voltage signal is a positive voltage level and the second voltage signal is a negative voltage level.

In one embodiment, a driving sequence of the display frame is the first row sub-pixels, the second row sub-pixels and the third row sub-pixels.

In one embodiment, the first driving module comprises: a first transistor comprising a first source electrode, a first gate electrode and a first drain electrode wherein the first source electrode receives the clock signal, the first gate electrode is connected to the node, and the first drain electrode is connected to scan output terminal for correspondingly outputting the first scan signal to the scan line based on the period of the clock signal; a second transistor comprising a second source electrode, a second gate electrode and a second drain electrode wherein the second source electrode is connected to the first source electrode for receiving the clock signal, the second gate electrode is connected to the first gate electrode and the node, and the second drain electrode outputs a current stage control signal which is the same as the first scan signal of the scan output terminal; and a capacitor having two terminals, wherein the two terminals of the capacitor are electrically connected to the node and the scan output terminal.

In one embodiment, the second driving module comprises a third transistor comprising a third source electrode, a third gate electrode and a third drain electrode wherein the third source electrode receives the first voltage signal, the third gate electrode receives the previous stage control signal, and the third drain electrode is connected to the node; a fourth transistor comprising a fourth source electrode, a fourth gate electrode and a fourth drain electrode wherein the fourth source electrode receives the first voltage signal which received by the fourth gate electrode, and the fourth drain electrode is connected to the third driving module; and a fifth transistor comprising a fifth source electrode, a fifth gate electrode and a fifth drain electrode wherein the fifth source electrode is connected to the fourth source electrode, the fifth gate electrode is connected to the node, and the fifth drain electrode is connected to the second driving module and the third driving module.

In one embodiment, the third driving module comprises a sixth transistor comprising a sixth source electrode, a sixth gate electrode and a sixth drain electrode wherein the sixth source electrode is connected to the second driving module, the sixth gate electrode is connected to the node, and the sixth drain electrode outputs the second voltage level; a seventh transistor comprising a seventh source electrode, a seventh gate electrode and a seventh drain electrode wherein the seventh source electrode is connected to the first driving module and the second driving module, the seventh gate electrode is connected to the sixth source electrode, and the seventh drain electrode is connected to the sixth drain electrode for receiving the second voltage level; an eighth transistor comprising an eighth source electrode, an eighth gate electrode and an eighth drain electrode wherein the eighth source electrode is connected to the node, the eighth gate electrode receives the next stage control signal, and the eighth drain electrode is connected to the sixth drain electrode and the seventh drain electrode for receiving the second voltage level; and a ninth transistor comprising a ninth source electrode, a ninth gate electrode and a ninth drain electrode wherein the ninth source electrode is connected to the scan output terminal, the ninth gate electrode is connected to the eighth gate electrode for receiving the next stage control signal, and the ninth drain electrode is connected to the sixth drain electrode, the seventh drain electrode and the eighth drain electrode for receiving the second voltage level.

In one embodiment, the first scan signal of one gate driving circuit overlaps the second scan signal of another gate driving circuit during a duty cycle of the clock signal for charging the scan line in the next stage in advance.

The present invention sets forth an array substrate according to one embodiment of the present invention. The array substrate comprises a gate driving circuit in the above-mentioned descriptions.

DETAILED DESCRIPTION OF THE PREFERRED EMBODIMENTS

Figure 1:
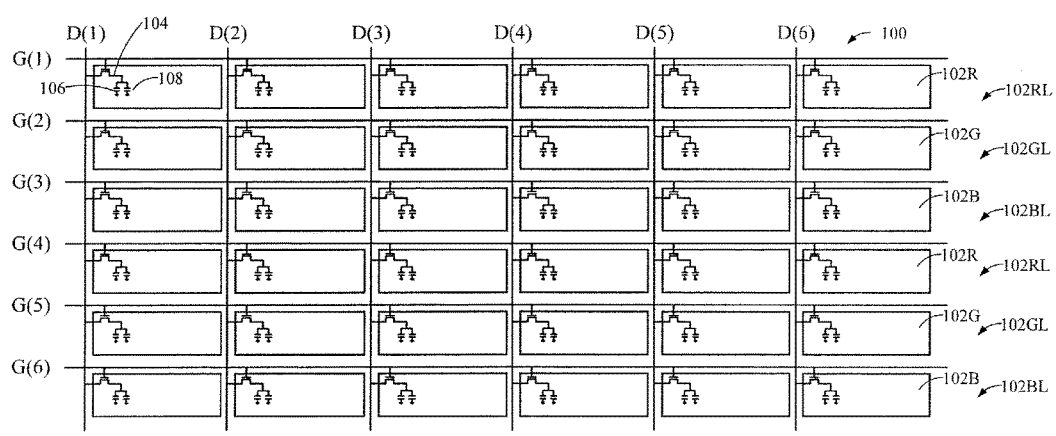
FIG. 1 is a schematic view of a display region with a tri-gate pixel arrangement according to one embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Please refer to FIG. 1, which is a schematic view of a display region with a tri-gate pixel arrangement according to one embodiment of the present invention. As shown in FIG. 1, the display frame 100 of the display region in the array substrate of LCD comprises a plurality of first row sub-pixels 102RL, a plurality of second row sub-pixels 102GL and a plurality of third row sub-pixels 102BL wherein each of first row sub-pixels 102RL, second row sub-pixels 102GL and third row sub-pixels 102BL is composed of a plurality of sub-pixel units 102R, 102G, 102B respectively. Each of first row sub-pixels 102RL, second row sub-pixels 102GL and third row sub-pixels 102BL is composed of a plurality of sub-pixel units 102R, 102G, 102B correspondingly electrically connected to one of scan lines, e.g. six scan lines G(1) to G(6) in FIG. 1, but not limited, and each scan line is electrically connected to a gate driver (not shown). Each column sub-pixel D(1) to D(6) comprises a plurality of sub-pixel units 102R, 1026, 102B sequentially, e.g. six sub-pixel units 102R, 102G, 102B, but not limited, and each column sub-pixel D(l) to D(6) is electrically connected to a source driver (not shown) via a data line. Each sub-pixel unit 102R, 1026, 102B comprises a transistor 104, a liquid-crystal capacitor 106 connected to transistor 104, and a storage capacitor 108 connected to the transistor 104. The gate driving circuit is disposed between each scan lines G(1) to G(6) and each row sub-pixels 102RL, 102GL, 102BL.

Figure 2:
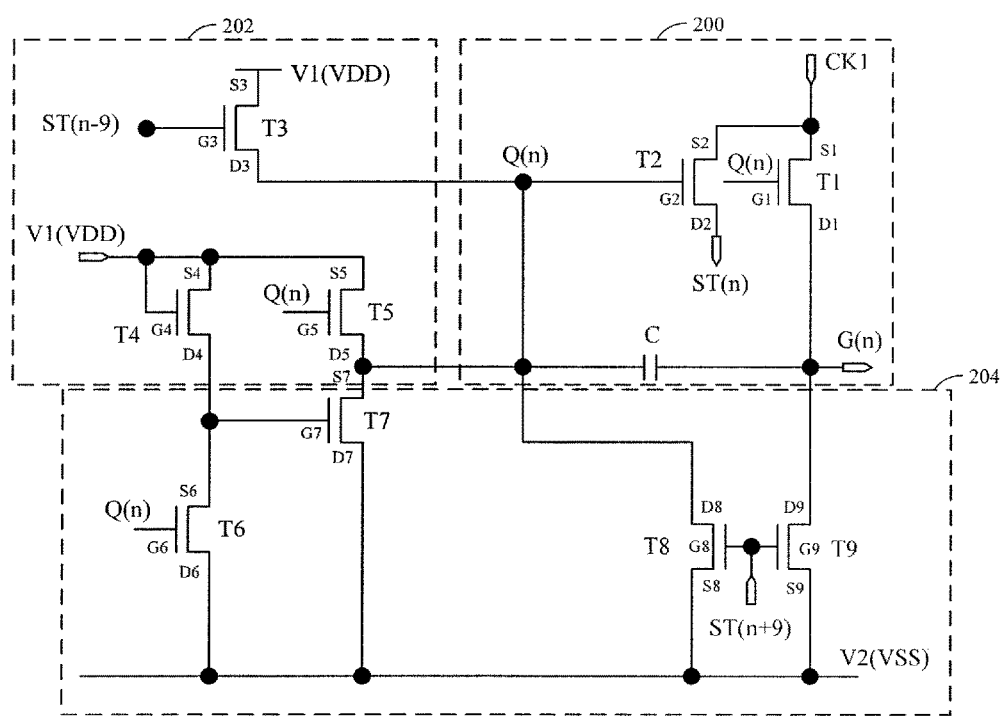
FIG. 2 is a schematic view of a gate driving circuit according to one embodiment of the present invention.

Please refer to FIGS. 1 and 2. FIG. 2 is a schematic view of a gate driving circuit according to one embodiment of the present invention. The gate driving circuit comprises a first driving module 200, a second driving module 202 and a third driving module 204 wherein the first driving module 200, the second driving module 202 and the third driving module 204 are electrically connected each other. The first driving module 200 receives a clock signal CK1, e.g. a square wave signal with duty cycle 50% in one period, but not limited, wherein the first driving module 200 comprises a node Q(n) and a scan output terminal G(n) correspondingly connected to one of scan lines G(1) to G(6). The second driving module 202 is electrically connected to the first driving module 200 for receiving a previous stage control signal ST(n−9) and first voltage signal V1, e.g. a positive voltage level VDD. For example, if the numeral n=10, the scan output terminal G(n−9) is equal to the signal from the scan output terminal G(1). When the previous stage control signal ST(n−9) enables the second driving module 202, the second driving module 202 outputs the first voltage signal V1 to the first driving module 200 in order to pull up the level of node Q(n) to a high level. When the node Q(n) is in the high level, the scan output terminal G(n) correspondingly outputs a first scan signal with high level to one of scan lines G(1) to G(6) based on the period of the clock signal CK1 in order to drive the first row sub-pixel 102RL.

The third driving module 204 is electrically connected to the first driving module 200 and the second driving module 202 for receiving a next stage control signal ST(n+9) and second voltage signal V2. When the next stage control signal ST(n+9) enables the third driving module 204, the third driving module 204 outputs the second voltage signal V2, e.g. a negative voltage level VSS, to the second driving module 202 in order to pull down the levels of node Q(n) and the scan output terminal G(n) to a low level. When the node Q(n) is in the low level, the scan output terminal G(n) correspondingly outputs a first scan signal with low level to one of scan lines G(1) to G(6) based on the period of the clock signal CK1 until the first row sub-pixels 102RL are driven by different gate driving circuits respectively. In one display frame 100, the present invention pulls up and pulls down the level of the node Q(n) for controlling the scan output terminal G(n) to output the scan signal with the high level and the low level. Each gate driving circuit generates a first scan signal for driving each first row sub-pixel 102RL to allow the data to be written to each first sub-pixel unit 102R of each first row sub-pixel 102RL. Afterwards, each gate driving circuit generates a second scan signal for driving each second row sub-pixel 102GL to allow the data to be written to each second sub-pixel unit 102G of each second row sub-pixel 102GL. Finally, each gate driving circuit generates a third scan signal for driving each third row sub-pixel 102BL to allow the data to be written to each third sub-pixel unit 102B of each third row sub-pixel 102BL.

As shown in FIGS. 1 and 2, the first driving module 200 comprises a first transistor T1 and a second transistor T2. The first transistor T1 comprises a first source electrode S1 for receiving the clock signal CK1, a first gate electrode G1 connected to node Q(n), and a first drain electrode D1 connected to scan output terminal G(n) for correspondingly outputting a first scan signal with high level to one of scan lines G(1) to G(6) based on the period of the clock signal CK1 wherein "n" is a positive integer and represents a stage serial number of the scan lines and/or row sub-pixel. The second transistor T2 comprises a second source electrode S2 connected to first source electrode S1 for receiving the clock signal CK1, a second gate electrode G2 connected to first gate electrode G1 and node Q(n), and a second drain electrode D2 for outputting a current stage control signal ST(n) wherein the current stage control signal ST(n) is the same as the first scan signal of the scan output terminal G(n). Two terminals of capacitor "C" are electrically connected to node Q(n) and the scan output terminal G(n) for pulling up the level of node Q(n) once more.

In FIGS. 1 and 2, the second driving module 202 comprises a third transistor T3, a fourth transistor T4 and a fifth transistor T5. The third transistor T3 comprises a third source electrode S3 for receiving the first voltage signal V1, a third gate electrode G3 for receiving the previous stage control signal ST(n−9), and a third drain electrode D3 connected to node Q(n). The fourth transistor T4 comprises a fourth source electrode S3 for receiving the first voltage signal V1 which received by the fourth gate electrode G4, and a fourth drain electrode D4 connected to the third driving module 204. The fifth transistor T5 comprises a fifth source electrode S5 connected to fourth source electrode S4, a fifth gate electrode G5 connected to node Q(n), and a fifth drain electrode D5 connected to the second driving module 202 and third driving module 204.

As shown in FIGS. 1 and 2, the third driving module 204 comprises a sixth transistor T6, a seventh transistor T7, an eighth transistor T8 and a ninth transistor T9. The sixth transistor T6 comprises a sixth source electrode S6 connected to second driving module 202, a sixth gate electrode G6 connected to node Q(n), and a sixth drain electrode D6 for outputting a second voltage level V2. The seventh transistor T7 comprises a seventh source electrode S7 connected to first driving module 200 and second driving module 202, a seventh gate electrode G7 connected to sixth source electrode S6, and a seventh drain electrode D7 connected to sixth drain electrode D6 for receiving the second voltage level V2. The eighth transistor T8 comprises an eighth source electrode S8 connected to node Q(n), an eighth gate electrode G8 for receiving a next stage control signal ST(n+9), and an eighth drain electrode D8 connected to sixth drain electrode D6 and seventh drain electrode D7 for receiving second voltage level V2. The ninth transistor T9 comprises a ninth source electrode S9 connected to scan output terminal G(n), a ninth gate electrode G9 connected to eighth gate electrode G8 for receiving the next stage control signal ST(n+9), and a ninth drain electrode D9 connected to sixth drain electrode D6, seventh drain electrode D7 and eighth drain electrode D8 for receiving the second voltage level V2. It should be noted that the source electrode and drain electrode of the transistor in the present invention can be mutually exchanged. In one embodiment, the nodes Q(n) are connected to gate electrodes of the first transistor T1, second transistor T2, fifth transistor T5 and sixth transistor T6 respectively and have the same voltage level.

Figure 3A:
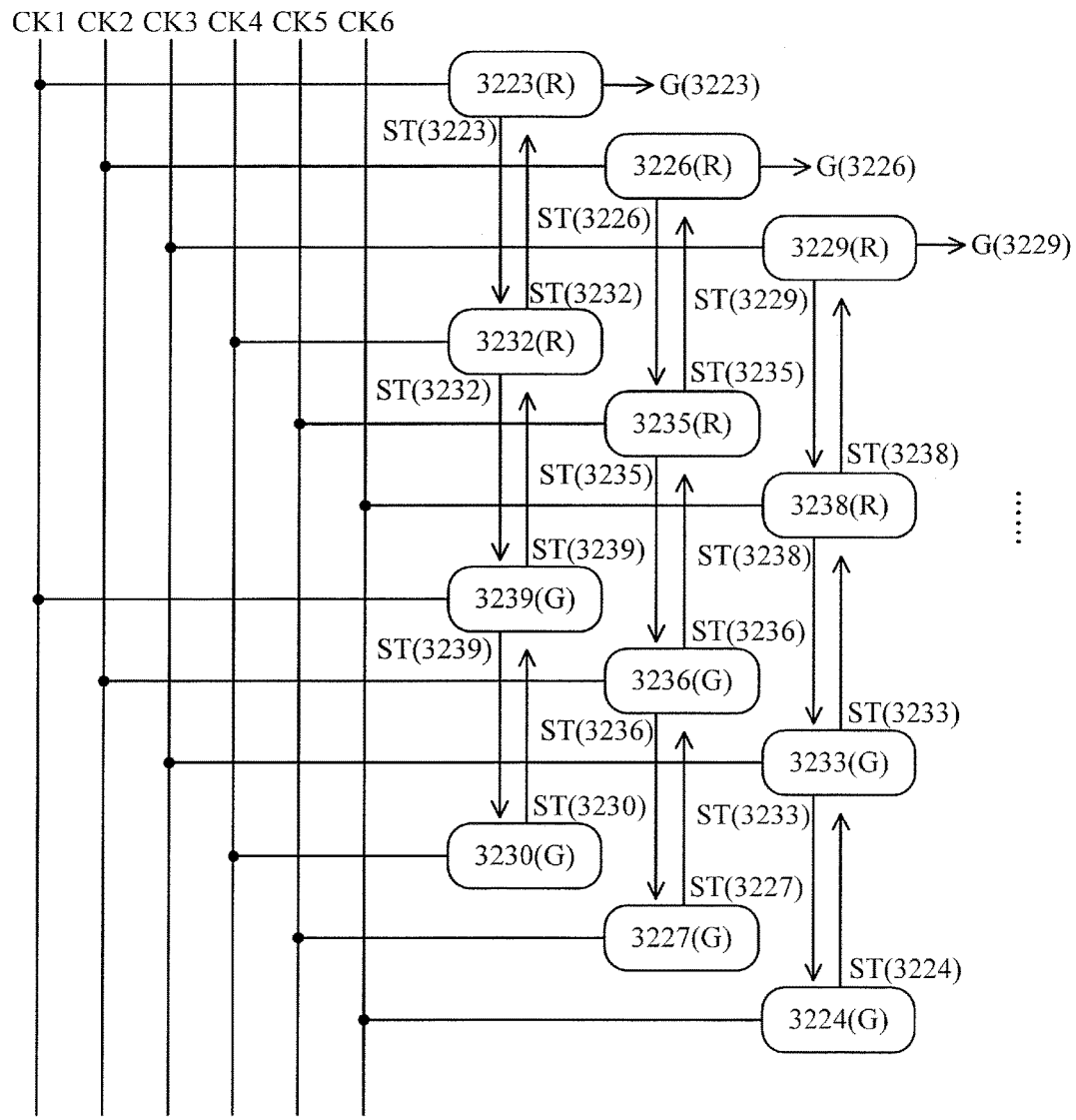
FIGS. 3A and 3B are schematic views of transmission sequence of gate driving signals for driving the sub-pixels which are connected to the gate lines respectively according to one embodiment of the present invention.
Figure 3B:
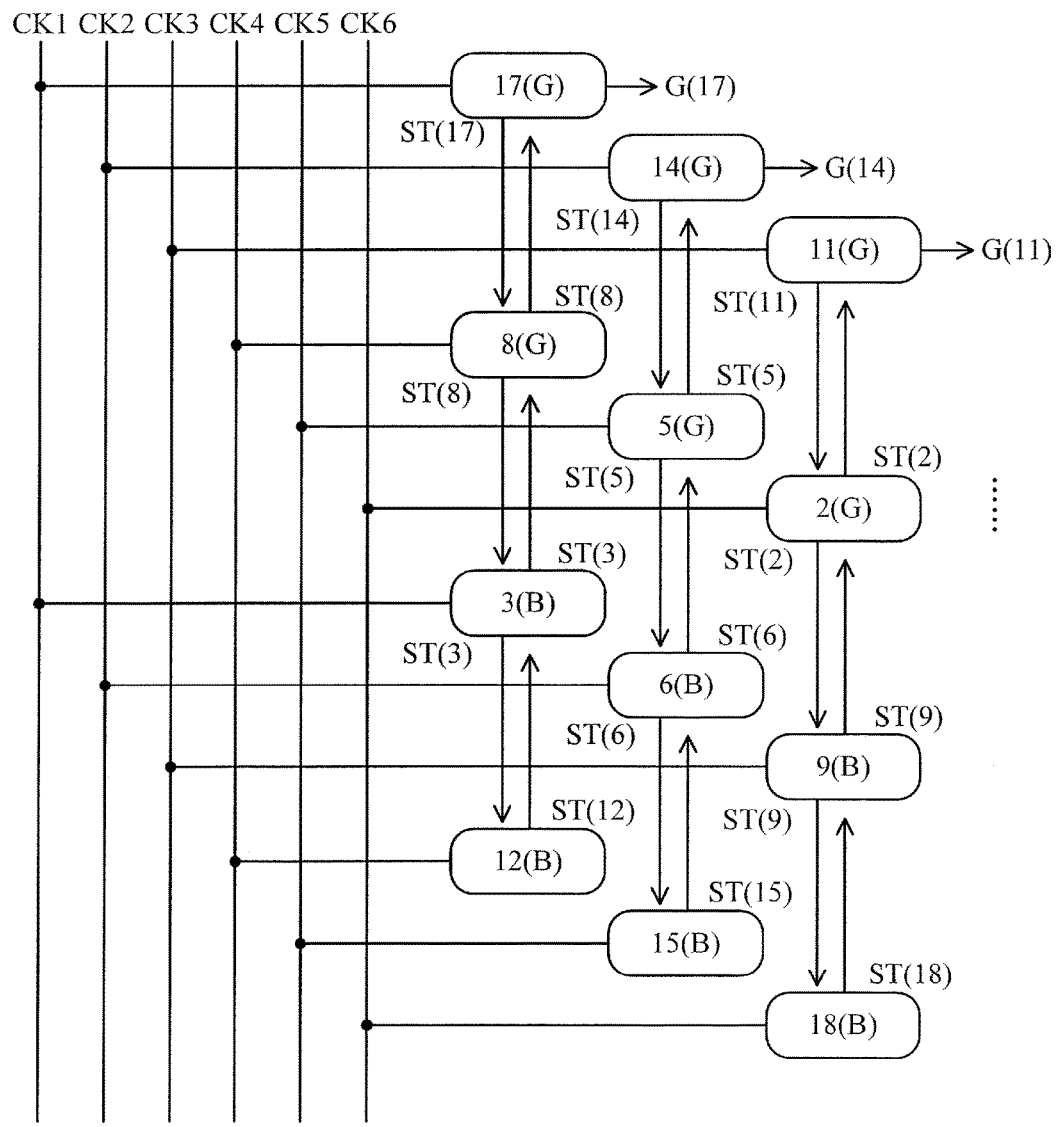

Please refer to FIGS. 3A and 3B, which are schematic views of transmission sequence of gate driving signals for driving the sub-pixels which are connected to the gate lines respectively according to one embodiment of the present invention. For an example of a resolution with full high definition (FHD) in FIGS. 3A and 3B, the sub-pixel amount of one row pixel is 3240 (1080*3) wherein the one row pixel is composed of three row sub-pixels. In one embodiment of FIG. 3A, six clock signals CK1 to CK6 are generated by a timing controller and six gate driving circuits 3223(R), 3226(R), 3229(R), 3232(R), 3235(R), 3238(R) are connected to the six clock signals CK1 to CK6 respectively. Another six gate driving circuits 3239(G), 3236(G), 3233(G), 3230(G), 3227(G), 3224(G) are connected to the six clock signals CK1 to CK6 respectively. The previous control signal ST(3223) and next stage control signal ST(3232) are formed between six gate driving circuits 3223(R), 3232(R) for controlling the six gate driving circuits 3223(R), 3232(R). The previous control signal ST(3226) and next stage control signal ST(3235) are formed between six gate driving circuits 3226(R), 3235(R) for controlling the six gate driving circuits 3226(R), 3235(R). The previous control signal ST(3229) and next stage control signal ST(3238) are formed between six gate driving circuits 3229(R), 3238(R) for controlling the six gate driving circuits 3229(R), 3238(R). Similarly, the previous control signal ST(3239) and next stage control signal ST(3230) are formed between six gate driving circuits 3239(R), 3230(R) for controlling the six gate driving circuits 3239(R), 3230(R). The previous control signal ST(3236) and next stage control signal ST(3227) are formed between six gate driving circuits 3236(R), 3227(R) for controlling the six gate driving circuits 3236(R), 3227(R). The previous control signal ST(3233) and next stage control signal ST(3224) are formed between six gate driving circuits 3233(R), 3224(R) for controlling the six gate driving circuits 3233(R), 3224(R). In one display frame of FIG. 3A, all the red row sub-pixels are first written by the data signal and then all the green row sub-pixels are written by data signal after the red row sub-pixels are written completely. For example, the data signal is written to the red row sub-pixels from the bottom to top of the one display frame and the data signal is then written to the green row sub-pixels in FIG. 3A.

In one embodiment of FIG. 3B, six clock signals CK1 to CK6 are generated and six gate driving circuits 17(G), 14(G), 11(G), 8(G), 5(G), 2(G) are connected to the six clock signals CK1 to CK6 respectively. Another six gate driving circuits 3(B), 6(B), 9(B), 12(B), 15(B), 18(B) are connected to the six clock signals CK1 to CK6 respectively. The previous control signal ST(17) and next stage control signal ST(8) are formed between six gate driving circuits 17(G), 8(G) for controlling the six gate driving circuits 17(G), 8(G). The previous control signal ST(14) and next stage control signal ST(5) are formed between six gate driving circuits 14(G), 5(G) for controlling the six gate driving circuits 14(G), 5(G). The previous control signal ST(11) and next stage control signal ST(2) are formed between six gate driving circuits 11(G), 2(G) for controlling the six gate driving circuits 11(G), 2(G). Similarly, the previous control signal ST(3) and next stage control signal ST(12) are formed between six gate driving circuits 3(B), 12(B) for controlling the six gate driving circuits 3(B), 12(B). The previous control signal ST(6) and next stage control signal ST(15) are formed between six gate driving circuits 6(B), 15(B) for controlling the six gate driving circuits 6(B), 15(B). The previous control signal ST(9) and next stage control signal ST(18) are formed between six gate driving circuits 9(B), 18(B) for controlling the six gate driving circuits 9(B), 18(B). In one display frame of FIG. 3A, all the red row sub-pixels are first written by the data signal and then all the green row sub-pixels are written by data signal after the red row sub-pixels are written completely. In the one display frame of FIG. 3B, the data signal is written to the green row sub-pixels from the top to bottom of the one display frame and the data signal is then written to the blue row sub-pixels.

Figure 4:
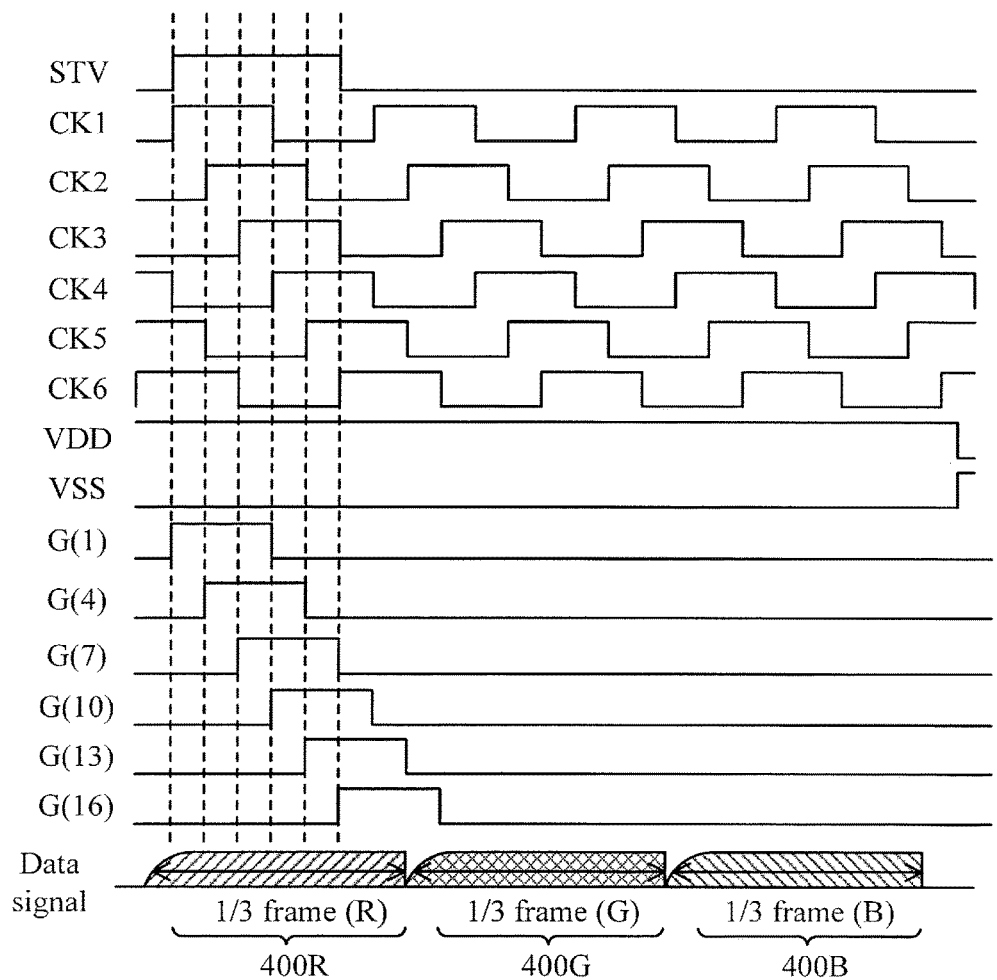
FIG. 4 is a schematic waveform timing view of the gate driving circuit and the data signals according to one embodiment of the present invention.

Please refer to FIG. 4, which is a schematic waveform timing view of the gate driving circuit and the data signals according to one embodiment of the present invention. In one display frame 100, a starting signal STV, six clock signals CK1 to CK6, a first voltage signal V1 such as positive voltage signal VDD, a second voltage signal V2 such as negative voltage signal VSS, scan signals G(1), G(4), G(7), G(10), G(13), G(16) but not limited, and data signal wherein the six clock signals CK1 to CK6 therebetween preferably include a phase difference and corresponds to the scan signals G(1), G(4), G(7), G(10), G(13), G(16) respectively. In one display frame 100, all the red sub-pixels are written, then all the green sub-pixels are written, and finally all the blue sub-pixels are written. Therefore, only the first scan line, e.g. G(1), in red sub-pixels, green sub-pixels or blue sub-pixels are affected by the RC delay of the data signal, but the rest, e.g. red sub-pixels G(4), G(7), G(10), G(13) and G(16), of the red sub-pixels, green sub-pixels or blue sub-pixels in view of the same color sub-pixels are not affected by the RC delay of the data signal, thereby improving the color deviation. In one embodiment, the data signals is first for one-third display frame with red row sub-pixel 400R, the data signals is the for one-third display frame with green row sub-pixel 400G and the data signals is finally for one-third display frame with blue row sub-pixel 400B.

Moreover, the first scan signal G(1) of one gate driving circuit overlaps the second scan signal G(4) of another gate driving circuit during the duty cycle of the clock signal CK1 for charging the scan line (G4) in the next stage in advance so that the charging level of the scan line maintains an sufficient voltage level. In one embodiment of FIG. 4, the signals of nodes Q(1), Q(4) and Q(7) are the same as the starting signal STV and the rest of signals in nodes Q(n) for different stages is formed by the combination of the scan signals G(n) and stage control signal ST(n−9).

The gate driving circuit and an array substrate using the same in the present invention pulls up and pulls down the voltage level of the node in one display frame to control the high level and low level respectively of scan signal in the scan output terminal for sequentially writing data signal to all the first row sub-pixels, all the second row sub-pixels and all the third row sub-pixels of the one display frame in order to prevent the sub-pixels from RC delay and color deviation, thereby improving the display quality of the LCD.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A gate driving circuit which is disposed on an array substrate of a liquid crystal display (LCD), wherein the array substrate comprises a display frame having a plurality of first row sub-pixels, a plurality of second row sub-pixels and a plurality of third row sub-pixels, and each of the first row sub-pixels, the second row sub-pixels and the third row sub-pixels is electrically connected to one scan line corresponding to the gate driving circuit, the gate driving circuit comprising:

a first driving circuit, for receiving a clock signal wherein the first driving circuit comprises a node and a scan output terminal correspondingly connected to a scan line, and comprises a first transistor and a second transistor;

a second driving circuit electrically connected to the first driving circuit, for receiving a previous stage control signal and a first voltage signal wherein when the previous stage control signal enables the second driving circuit, the second driving circuit outputs the first voltage signal to the first driving circuit in order to pull up a level of the node to a high level, and when the node is in the high level, the scan output terminal correspondingly outputs a first scan signal with the high level to the scan line based on a period of the clock signal in order to drive the first row sub-pixels;

a third driving circuit electrically connected to the first driving circuit and the second driving circuit, for receiving a next stage control signal and a second voltage signal wherein when the next stage control signal enables the third driving circuit, the third driving circuit outputs the second voltage signal to the second driving circuit in order to pull down the level of node and the scan output terminal to the low level, and when the node is in the low level, the scan output terminal correspondingly outputs the first scan signal with the low level to the scan line based on the period of the clock signal until the first row sub-pixels are driven by different gate driving circuits respectively;

a third transistor comprising a third source electrode, a third gate electrode and a third drain electrode wherein the third source electrode receives the first voltage signal, the third gate electrode receives the previous stage control signal, and the third drain electrode is connected to the node; and a fourth transistor comprising a fourth source electrode, a fourth gate electrode and a fourth drain electrode wherein the fourth source electrode receives the first voltage signal which received by the fourth gate electrode, and the fourth drain electrode is connected to the third driving circuit;

a fifth transistor comprising a fifth source electrode, a fifth gate electrode and a fifth drain electrode wherein the fifth source electrode is connected to the fourth source electrode, the fifth gate electrode is connected to the node, and the fifth drain electrode is connected to the second driving circuit and the third driving circuit.

2. The gate driving circuit of claim 1, wherein the display frame is sequentially arranged by different types of the first row sub-pixels, the second row sub-pixels and the third row sub-pixels, and the first row sub-pixels, the second row sub-pixels and the third row sub-pixels form the display frame.

3. The gate driving circuit of claim 2, wherein the first row sub-pixels, the second row sub-pixels and the third row sub-pixels are composed of the red row sub-pixels, the green row sub-pixels and the blue row sub-pixels.

4. The gate driving circuit of claim 1, wherein a level of the first voltage signal is greater than a level of the second voltage signal, and the first voltage signal is a positive voltage level and the second voltage signal is a negative voltage level.

5. The gate driving circuit of claim 1, wherein a driving sequence of the display frame is the first row sub-pixels, the second row sub-pixels and the third row sub-pixels.

6. The gate driving circuit of claim 1, wherein the first driving circuit comprises:

the first transistor comprising a first source electrode, a first gate electrode and a first drain electrode wherein the first source electrode receives the clock signal, the first gate electrode is connected to the node, and the first drain electrode is connected to scan output terminal for correspondingly outputting the first scan signal to the scan line based on the period of the clock signal;

the second transistor comprising a second source electrode, a second gate electrode and a second drain electrode wherein the second source electrode is connected to the first source electrode for receiving the clock signal, the second gate electrode is connected to the first gate electrode and the node, and the second drain electrode outputs a current stage control signal which is the same as the first scan signal of the scan output terminal; and a capacitor having two terminals, wherein the two terminals of the capacitor are electrically connected to the node and the scan output terminal.

7. The gate driving circuit of claim 1, wherein the third driving circuit comprises:

a sixth transistor comprising a sixth source electrode, a sixth gate electrode and a sixth drain electrode wherein the sixth source electrode is connected to the second driving circuit, the sixth gate electrode is connected to the node, and the sixth drain electrode outputs the second voltage level;

a seventh transistor comprising a seventh source electrode, a seventh gate electrode and a seventh drain electrode wherein the seventh source electrode is connected to the first driving circuit and the second driving circuit, the seventh gate electrode is connected to the sixth source electrode, and the seventh drain electrode is connected to the sixth drain electrode for receiving the second voltage level;

an eighth transistor comprising an eighth source electrode, an eighth gate electrode and an eighth drain electrode wherein the eighth source electrode is connected to the node, the eighth gate electrode receives the next stage control signal, and the eighth drain electrode is connected to the sixth drain electrode and the seventh drain electrode for receiving the second voltage level; and a ninth transistor comprising a ninth source electrode, a ninth gate electrode and a ninth drain electrode wherein the ninth source electrode is connected to the scan output terminal, the ninth gate electrode is connected to the eighth gate electrode for receiving the next stage control signal, and the ninth drain electrode is connected to the sixth drain electrode, the seventh drain electrode and the eighth drain electrode for receiving the second voltage level.

8. The gate driving circuit of claim 1, wherein the first scan signal of one gate driving circuit overlaps a second scan signal of another gate driving circuit during a duty cycle of the clock signal for charging the scan line in the next stage in advance.

9. An array substrate, comprising a gate driving circuit described in the claim 1.

* * * * *